United States Patent
Quan et al.

(10) Patent No.: US 9,591,663 B2
(45) Date of Patent: *Mar. 7, 2017

(54) SCHEDULING REQUEST METHOD, APPARATUS AND SYSTEM

(71) Applicant: HUAWEI TECHNOLOGIES CO., LTD., Shenzhen (CN)

(72) Inventors: Wei Quan, Beijing (CN); Yi Jiang, Shenzhen (CN); Jian Zhang, Beijing (CN); Arnaud Meylan, Shenzhen (CN); Qiao Zhang, Shenzhen (CN); Zhongbin Qin, Shenzhen (CN); Guanglin Han, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,283

(22) Filed: Nov. 3, 2015

(65) Prior Publication Data

US 2016/0057773 A1 Feb. 25, 2016

Related U.S. Application Data

(63) Continuation of application No. 13/544,404, filed on Jul. 9, 2012, now Pat. No. 9,210,692, which is a
(Continued)

(30) Foreign Application Priority Data

Jan. 8, 2010 (CN) .......................... 2010 1 0001225

(51) Int. Cl.
*H04W 72/12* (2009.01)
*H04W 72/04* (2009.01)

(52) U.S. Cl.
CPC ....... *H04W 72/1289* (2013.01); *H04W 72/04* (2013.01); *H04W 72/042* (2013.01); *H04W 72/1278* (2013.01)

(58) Field of Classification Search
CPC ... H04W 28/04; H04W 72/04; H04W 72/042; H04W 88/08; H04W 72/1289; H04W 72/1278; H04L 5/0007
See application file for complete search history.

(56) References Cited

U.S. PATENT DOCUMENTS 8,036,110 B2 * 10/2011 Ishii ...................... H04L 1/1854
370/229
8,576,784 B2 * 11/2013 Lohr ..................... H04L 5/0007
370/329
(Continued)

FOREIGN PATENT DOCUMENTS

CN 1805562 7/2006
CN 101106800 1/2008
(Continued)

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 9)"; 3GPP TS 36.321 V9.1.0 (Dec. 2009); (48 pages).
(Continued)

*Primary Examiner* — Andrew Lai
*Assistant Examiner* — Hoyet H Andrews
(74) *Attorney, Agent, or Firm* — Staas & Halsey LLP

(57) ABSTRACT

A scheduling request method, network side device, terminal device and system, belong to the field of communications technologies. The method includes: configuring a first shared resource used for a scheduling request (SR), and sending first information to multiple terminal devices to
(Continued)

notify of the first shared resource (101); receiving the SR on the first shared resource (102); allocating a second shared resource of uplink data to the multiple terminal devices, or allocating a dedicated resource of uplink data to at least one of the multiple terminal devices (103). The network side device includes: a configuration module, a receiving module and an allocation module. The terminal device includes: a receiving module, a request module and a sending module. The present invention avoids the waste of the uplink data resource, and improves a utilization rate of the uplink data resource and a transmission success rate of the uplink data.

18 Claims, 5 Drawing Sheets

Related U.S. Application Data continuation of application No. PCT/CN2011/070055, filed on Jan. 6, 2011.

(56) References Cited

U.S. PATENT DOCUMENTS

| | | | | |
|---|---|---|---|---|
| 8,625,442 | B2* | 1/2014 | Ratasuk | H04L 1/1657 370/252 |
| 8,711,765 | B2* | 4/2014 | Bertrand | H04W 74/04 370/328 |
| 2007/0105574 | A1* | 5/2007 | Gupta | H04W 72/0406 455/509 |
| 2008/0165733 | A1 | 7/2008 | Xiao et al. | |
| 2008/0311919 | A1 | 12/2008 | Whinnett et al. | |
| 2008/0318607 | A1 | 12/2008 | Torsner et al. | |
| 2009/0116434 | A1* | 5/2009 | Lohr | H04L 5/0007 370/329 |
| 2009/0227277 | A1* | 9/2009 | Gupta | H04W 74/085 455/512 |
| 2010/0002800 | A1 | 1/2010 | Kim et al. | |
| 2012/0044816 | A1* | 2/2012 | Ratasuk | H04L 1/1657 370/252 |

FOREIGN PATENT DOCUMENTS

| | | | |
|---|---|---|---|
| CN | 101350940 | 1/2009 | |
| CN | 101411240 | 4/2009 | |
| EP | 2099248 A2 | 9/2009 | |
| WO | 2008/154870 | 12/2008 | |
| WO | 2009/099301 | 8/2009 | |
| WO | WO 2010057540 A1 * | 5/2010 | ........... H04L 5/0007 |

OTHER PUBLICATIONS

European Office Action dated Aug. 21, 2015 in related European Patent Application No. 117316760.0 (5 pages).
European Office Action dated Dec. 10, 2014 in related European Patent Application No. 11731676.0 (5 pages).
Ericsson et al., "E-mail summary taking you forward on uplink control signaling", TSG-RAN WG1 #50bis, Oct. 2007, 5 pages.
Ericsson et al., "Scheduling Request in E-UTRAN", TSG-RAN WG2 #56bis, Jan. 2007, 11 pages.
MAC Rapporteurs, "36.321 CR covering agreements of RAN2 #61bis and RAN2 #62", Change Request, Rev. 1, May 2008, 33 pages.
Extended European Search Report issued Oct. 23, 2012 in corresponding European Patent Application No. 11731676.0.
Written Opinion of the International Searching Authority issued Apr. 7, 2011 in corresponding International Patent Application No. PCT/CN2011/070055.
Office Action dated Jan. 29, 2013, in corresponding Chinese Patent Application No. 201010001225.0 (23 pages).
Chinese Office Action mailed Jul. 2, 2013 in corresponding Chinese Patent Application No. 201010001225.0.
International Search Report of Corresponding PCT Application PCT/CN2011/070055 mailed Dec. 30, 2010.
Non-Final Office Action dated Jun. 4, 2014 in parent U.S. Appl. No. 13/544,404 (43 pages).
Final Office Action dated Oct. 23, 2014 in parent U.S. Appl. No. 13/544,404 (30 pages).
Non-Final Office Action dated Apr. 3, 2015 in parent U.S. Appl. No. 13/544,404 (33 pages).
Notice of Allowance mailed Aug. 4, 2015 in parent U.S. Appl. No. 13/544,404 (19 pages).
U.S. Appl. No. 13/544,404, filed Jul. 9, 2012, Wei Quan et al., Huawei Technologies Co., Ltd. Shenzhen, P.R. China.

* cited by examiner

SCHEDULING REQUEST METHOD, APPARATUS AND SYSTEM

CROSS-REFERENCE TO RELATED APPLICATIONS

This application is a continuation of U.S. application Ser. No. 13/544,404, filed on Jul. 9, 2012, which is a continuation of International Application No. PCT/CN2011/070055, filed on Jan. 6, 2011, which claims priority to Chinese Patent Application No. 201010001225.0, filed on Jan. 8, 2010, The afore-mentioned patent applications are hereby incorporated by reference in their entireties.

FIELD OF THE INVENTION

The present invention relates to the field of communications technologies, and in particular, to a scheduling request technology.

BACKGROUND OF THE INVENTION

The LTE-A (Long Term Evolution-Advance, long term evolution-advanced) technology is a further evolution of the LTE (Long Term Evolution, long term evolution), and is capable of further increasing a data rate, reducing a delay, and improving coverage on the basis of the LTE. In order to reduce a transmission delay of uplink data, a technology of performing uplink data transmission through CB (Contention Based, contention based) uplink granting is proposed in the LTE-A, and different from a conventional procedure of performing scheduling when a UE (User Equipment, user equipment) makes a request, the technology is a manner that an eNB (evolved Node B, evolved Node B) performs scheduling by initiatively allocating resources.

The conventional scheduling procedure is as follows: When a certain triggering condition is satisfied, a UE sends an SR (Scheduling Request, scheduling request) to an eNB so as to request scheduling; after receiving the SR, the eNB allocates an uplink resource to the UE through a PDCCH (Physical Downlink Control Channel, physical downlink control channel) command scrambled by a C-RNTI (Cell Radio Network Temporary Identifier, cell radio network temporary identifier), and after receiving the command, the UE sends uplink data to the eNB on a corresponding resource.

A procedure of performing contention based uplink data transmission in the LTE-A is as follows: An eNB allocates a CB resource (a contention resource) used for a scheduling request to multiple UEs, where the resource is a PUSCH (Physical Uplink Shared Channel, physical uplink shared channel) resource; a UE that has intercepted the CB resource uses the resource to send uplink data to the eNB, and its own identifier C-RNTI is carried; if the eNB decodes the uplink data successfully after receiving it, the eNB uses a PHICH (Physical HARQ Indication Channel, physical HARQ indication channel) to feed back ACK (ACKnowledge, acknowledgement) to the UE, and if the uplink data is not decoded, the eNB uses the PHICH to feed back NACK (Negative ACKnowledge, negative acknowledgement) to the UE, indicating that a conflict occurs; after receiving the NACK, every UE sending data on the CB resource may withdraw for a period of time randomly so as to avoid another conflict during retransmission, and perform retransmission by using the CB resource again.

The CB resource allocation manner in the prior art may cause a waste of the CB resources, for example, when no UE sends the uplink data or when multiple UEs send the uplink data at the same time and cause a conflict, a low utilization rate of the CB resource is caused.

SUMMARY OF THE INVENTION

In order to overcome defects of the prior art, embodiments of the present invention provide a scheduling request method, network side device, terminal device and system.

In one aspect, the present invention provides a scheduling request method, where the method includes: configuring a first shared resource for multiple terminal devices, where the first shared resource is used for the terminal device to send a scheduling request; sending first information to the multiple terminal devices, where the first information is used for notifying the terminal devices of the first shared resource; receiving the scheduling request SR from the first shared resource; allocating a second shared resource used for uplink data to the multiple terminal devices, or allocating a dedicated resource used for uplink data to at least one terminal device of the multiple terminal devices.

In another aspect, the present invention further provides a network side device, where the network side device includes: a configuration module, configured to configure a first shared resource for multiple terminal devices, where the first shared resource is used for the terminal device to send a scheduling request, and configured to send first information to the multiple terminal devices, where the first information is used for notifying the terminal devices of the first shared resource; a receiving module, configured to receive the scheduling request SR from the first shared resource; and an allocation module, configured to allocate a second shared resource used for uplink data to the multiple terminal devices, or allocate a dedicated resource used for uplink data to at least one terminal device of the multiple terminal devices.

In another aspect, the present invention provides a terminal device, and the terminal device includes: a receiving module, configured to receive first information sent by a network side device, where the first information is used for notifying of a first shared resource, and the first shared resource is used for the terminal device to send a scheduling request and is configured by a network side device for the terminal device and another terminal device together; a request module, configured to send a scheduling request SR to the network side device on the first shared resource; and a sending module, configured to, after the network side device allocates a second shared resource used for uplink data to the multiple terminal devices or allocates a dedicated resource used for uplink data to the terminal device, send the uplink data to the network side device on the second shared resource or the dedicated resource.

In another aspect, the present invention provides a scheduling request system, and the system includes a network side device and a terminal device as described above.

In technical solutions provided in the embodiments of the present invention, by allocating the resource of uplink data to the terminal device when an SR exists, the problem in the CB resource allocation manner in the prior art that the CB resource is wasted and has a low utilization rate is overcome, an effect of avoiding the waste of the uplink data resource is achieved, and a utilization rate of the uplink data resource and a transmission success rate of the uplink data are increased.

DETAILED DESCRIPTION OF THE EMBODIMENTS

In order to make objectives, technical solutions and advantages of the present invention clearer, embodiments of the present invention are further illustrated in detail through accompanying drawings.

Embodiment 1

Figure 1:
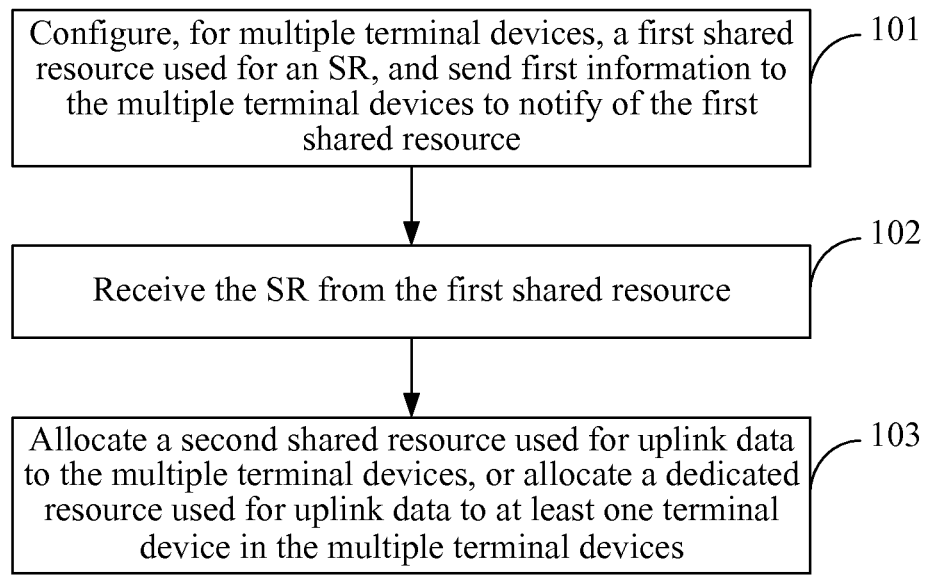
FIG. 1 is a flow chart of a scheduling request method according to Embodiment 1 of the present invention.

Referring to FIG. 1, this embodiment provides a scheduling request method, which includes the following content.

101: Configure a first shared resource for multiple terminal devices, where the first shared resource is used for a terminal device to send an SR; and send first information to the multiple terminal devices, where the first information is used for notifying a terminal device of the first shared resource.

102: Receive an SR from the first shared resource.

103: Allocate a second shared resource used for uplink data to the multiple terminal devices, or allocate a dedicated resource used for uplink data to at least one terminal device of the multiple terminal devices.

The method is mainly applicable to an apparatus for allocating a scheduling request resource and an uplink data resource to a terminal device, where the apparatus is generally a network side device, such as an eNB in the LTE, a Relay (relay), a NodeB (base station) in a UMTS (Universal Mobile Telecommunications System, universal mobile telecommunications system), and an RNC (Radio Network Controller, radio network controller), which is not specifically limited in the embodiment of the present invention.

In this embodiment, the resource of uplink data is allocated when an SR exists, and in comparison with the prior art in which the resource of the uplink data is always allocated, a waste of the uplink data resource is avoided greatly, and a utilization rate of the uplink data resource and a transmission success rate of the uplink data are increased.

Embodiment 2

Figure 2:
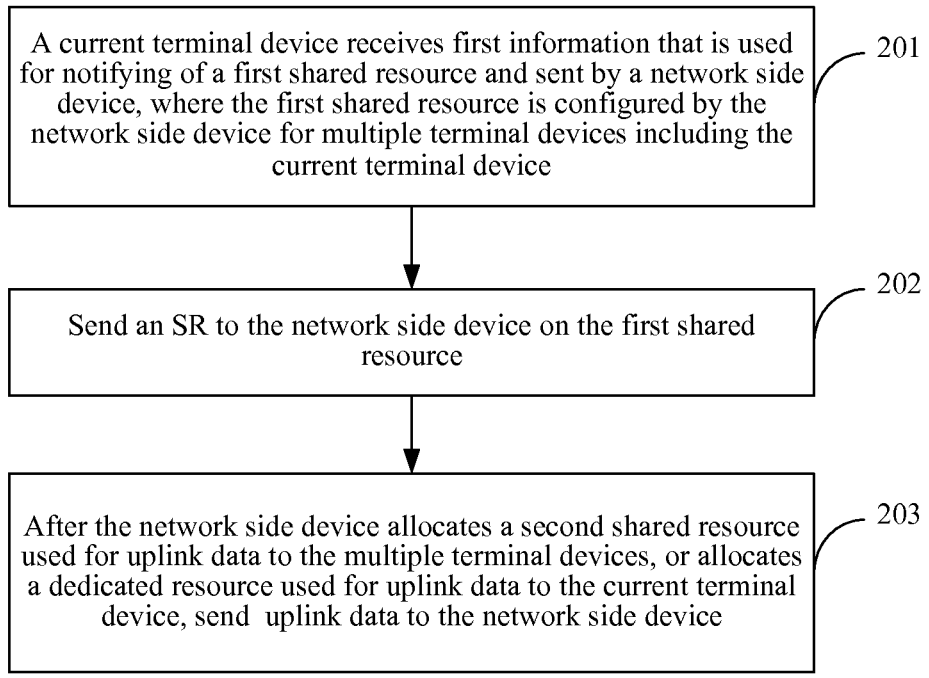
FIG. 2 is a flow chart of a scheduling request method according to Embodiment 2 of the present invention.

Referring to FIG. 2, this embodiment provides a scheduling request method, which includes the following content.

201: A current terminal device receives first information sent by a network side device, where the first information is used for notifying of a first shared resource, the first shared resource is used for a terminal device to send an SR and is configured by the network side device for multiple terminal devices, and the multiple terminal devices include the current terminal device.

202: Send an SR to the network side device on the first shared resource.

203: After the network side device allocates a second shared resource used for uplink data to the multiple terminal devices, or allocates a dedicated resource used for uplink data to the current terminal device, send uplink data to the network side device on the second shared resource or the dedicated resource.

The terminal device is a user side device, which includes, but is not limited to, a UE, and is not specifically limited in the embodiment of the present invention.

In this embodiment, the network side device allocates the resource of the uplink data when an SR exists, and after acquiring the resource the terminal device uses the resource to send the uplink data subsequently, which greatly avoids the waste of the uplink data resource, and increases a utilization rate of the uplink data resource and a transmission success rate of the uplink data.

By taking a case that the network side device is an eNB and the terminal device is a UE for example, how to allocate the resource of the scheduling request and the resource of the uplink data to the terminal device and how the terminal device sends the uplink data in different application scenario are illustrated separately. The different application scenarios refer to whether the network side device allocates an identifier to a shared resource used for the scheduling request, and whether the network side device allocates an index number to the terminal device. The eNB may be replaced with another device having a same function, the UE may also be replaced with another device having a same function, and the implementation procedure is the same, which is not repeated herein again.

Embodiment 3

Figure 3:
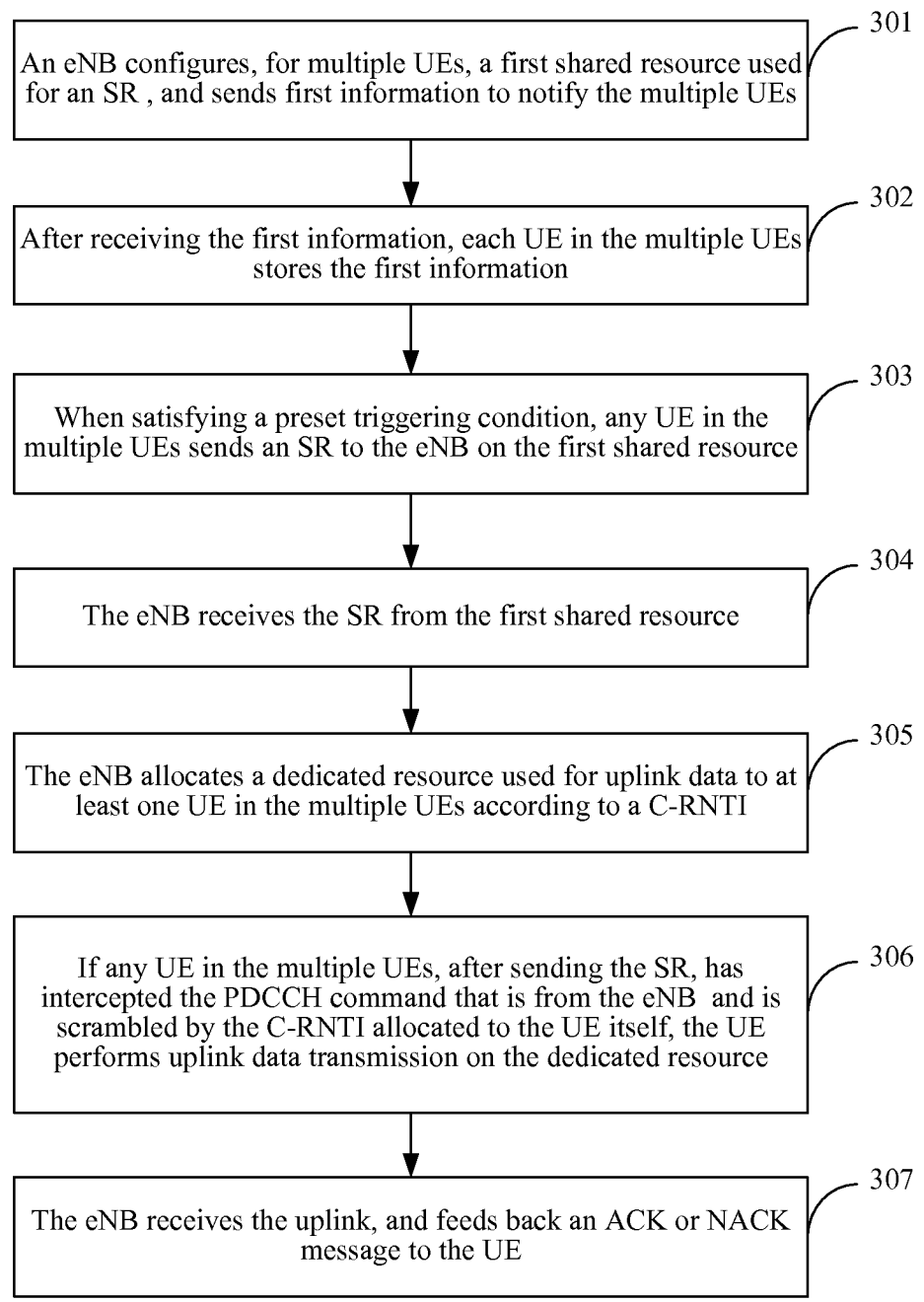
FIG. 3 is a flow chart of a scheduling request method according to Embodiment 3 of the present invention.

Referring to FIG. 3, this embodiment provides a scheduling request method, which is applicable to a scenario in which the eNB does not allocate an identifier to a shared resource used for a scheduling request, and does not allocate an index number to the UE, and specifically includes the following content.

301: The eNB configures, for multiple UEs, a first shared resource used for a scheduling request, and sends first information to the multiple UEs, where the first information is used for notifying the UE of the first shared resource.

The eNB may determine which UEs share an SR resource according to at least one of factors such as QoS (Quality of Service, quality of service) requirement of a service established by each UE, a service feature, a location of the UE or channel quality and the number of SR resources, and a strategy of the eNB. The service established by the UE includes, but is not limited to: a WWW (World Wide Web, world wide web) service, an FTP (File Transfer Protocol, file transfer protocol) service, an SMS (Short Messaging Service, short messaging service) service and so on, which is not specifically limited in the embodiment of the present invention. Moreover, during a process in which the service of the UE is performed, the eNB may also perform adjustment, for example, reducing or increasing the number of UEs sharing the SR, such as, allocating a dedicated SR resource to the UE instead of using a shared SR resource, so as to better ensure the QoS of the UE and/or better utilize the SR resource.

Specifically, the eNB may send the first information to the multiple UEs through an RRC (Radio Resource Control, radio resource control protocol) message, a MAC (Media Access Control, media access control) message, or a physical layer message, so as to notify the multiple UEs of the first shared resource, where the first information includes, but is not limited to: a resource, a sequence, a period and so on, which is not specifically limited in the embodiment of the present invention.

302: After receiving the RRC message, MAC message or physical layer message, each UE of the multiple UEs extracts and stores the first information, so as to subsequently initiate a scheduling request according to the first information.

303: When any UE of the multiple UEs satisfies a preset triggering condition, the UE sends an SR to the eNB on the first shared resource.

The triggering condition refers to a triggering condition of the scheduling request, which may be preset according to a requirement, for example, set as initiating an SR when uplink data is sent, or initiating an SR when data having higher priority arrives, or initiating an SR after time expires when a UL Grant (uplink grant) is not received for a period of time after an SR is sent, which is not specifically limited in the embodiment of the present invention.

In this embodiment, further, the eNB may also allocate different timer values (SR-Prohibit Timer value) to the multiple UEs sharing the resource, and notifies the UEs through the RRC message, MAC message or physical layer message. When the UE sends an SR on the shared resource for the first time, the timer is started, and before the timer expires, if no new triggering condition of the SR is satisfied, the SR is not sent any more, and if a new triggering condition of the SR is satisfied, the SR is sent again; after the timer expires, if the current triggering condition of the SR is still satisfied, the sending of the SR continues; and when the UE sends the SR again, the timer is restarted. By configuring different timers for the multiple UEs sharing the resource, another conflict may be avoided when the SR is sent again after the conflict, and thereby, the possibility of successive conflicts is reduced.

The current triggering condition of the SR refers to the preset triggering condition described in step 203, and the new triggering condition of the SR refers to another preset condition different from the current triggering condition.

304: The eNB receives the SR from the first shared resource. The resource is shared by multiple UEs, so the SR received by the eNB may be sent by one UE of the multiple UEs, and may also be the SR sent by at least two UEs at the same time.

305: The eNB does not allocate the identifier to the first shared resource, and does not allocate the identification index number to the UE, so after the eNB receives the SR, the eNB cannot judge whether the is sent by one UE or by multiple UEs, and which UE sends the SR, so the eNB allocates, according to a C-RNTI, a dedicated resource used for uplink data to at least one UE of the multiple UEs.

Specifically, the eNB may send a PDCCH command to each UE, and scramble the command by using the C-RNTI of each UE, so that each UE decodes the received PDCCH command by using its own C-RNTI, thereby obtaining information of the dedicated resource that is used for uplink data and allocated by the eNB to the UE itself.

When the eNB allocates the dedicated resource used for uplink data to at least one UE of the multiple UEs, an NDI (New Data Indicator, new data indicator) may be set to be new data transmission, that is to say, set to be different from an NDI value that is set when the C-RNTI is used for scheduling last time. The NDI is located in the PDCCH command, and the UE decides, according to the indicator, whether to transmit new uplink data or perform retransmission on the uplink data that fails to be transmitted. In this step, the setting, by the eNB, the NDI to be new data transmission is instructing the UE to use the dedicated resource used for uplink data to transmit new uplink data to the eNB, and the specific value of the NDI is different from the NDI value at the time of using the C-RNTI for scheduling last time. For example, the eNB allocates the shared resource used for uplink data to UE1 and UE2, if when the eNB schedules the UE1 last time, set NDI=0, when the UE1 is scheduled this time, set NDI=1, indicating new data transmission; and if when the eNB schedules the UE2 last time, NDI=1, when the UE2 is scheduled this time, set NDI=0, indicating new data transmission. Moreover, based on requirements, the eNB may also schedule retransmission of data sent by a certain UE or some UEs previously, and in this case, the NDI value in the PDCCH command is the same as the NDI value at the time of scheduling the UE last time.

306: After sending the SR, any UE of the multiple UEs intercepts the PDCCH command from the eNB, and if the PDCCH command scrambled by the C-RNTI allocated to the UE itself has been intercepted, it is indicated that the eNB allocates a dedicated resource used for uplink data to the UE itself, and therefore, the UE performs uplink data transmission on the dedicated resource. If it is new data transmission, the SR is cancelled after a cancellation condition of the SR is satisfied.

307: The eNB receives the uplink data from the dedicated resource; if the uplink data is decoded successfully, feeds back an ACK message to the UE corresponding to the dedicated resource; and if the uplink data is not decoded, feeds back an NACK message to the UE corresponding to the dedicated resource, and subsequently, may require the UE to retransmit or discard the uplink data according to requirements.

In this embodiment, the network side device allocates the resource of the uplink data when an SR exists, and after acquiring the resource, the terminal device uses the resource to send the uplink data, which, in comparison with the prior art, reduces the occupation on the PUSCH resource, greatly avoids the waste of the uplink data resource, increases a utilization rate of the uplink data resource and a transmission success rate of the uplink data. By allocating the dedicated resource of the uplink data, occurrence of a conflict may be avoided, and a delay brought by retransmission after the terminal device withdraws due to the conflict may be avoided. By configuring different timers for the multiple terminal devices sharing the SR resource, another conflict may be avoided when the SR is sent again after the conflict, and the possibility of successive conflicts is reduced. In comparison with a conventional SR procedure in which the delay is reduced by reducing a period of the SR, the occupation on the SR resource may be greatly reduced, and the number of accepted users is increased. By adopting a manner of sharing the resource for the scheduling request, a code word interval may be increased, and interference between SR resources is reduced, and thereby, decoding performance of the SR is improved.

Embodiment 4

Figure 4:
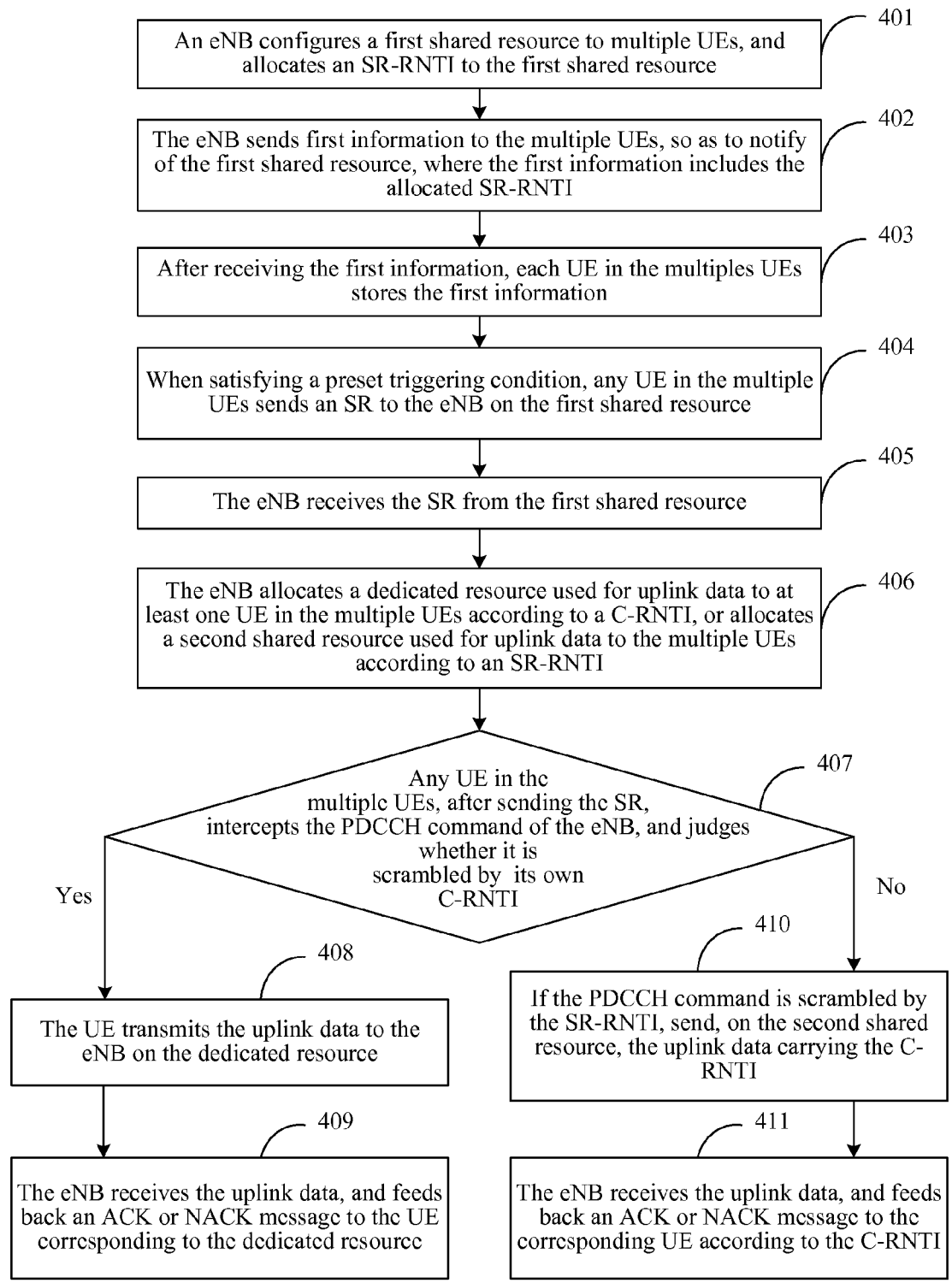
FIG. 4 is a flow chart of a scheduling request method according to Embodiment 4 of the present invention.

Referring to FIG. 4, this embodiment provides a scheduling request method, which is applicable to a scenario in which the eNB allocates an identifier to a shared resource used for a scheduling request, but does not allocate an index number to a UE, and specifically includes the following content.

401: The eNB configures a first shared resource for multiple UEs, where the first shared resource is used for a UE to send an SR, and allocates an SR-RNTI (Scheduling Request Cell Radio Network Temporary Identifier, scheduling request radio network temporary identifier) to the first shared resource.

How the eNB specifically determines which UEs share a SR resource is the same as the description in Embodiment 3.

402: The eNB sends first information to the multiple UEs, so as to notify of the first shared resource, where the first information includes the allocated SR-RNTI.

How the eNB specifically sends the first information to the multiple UEs, and the content in the first information except the SR-RNTI, are the same as the description in Embodiment 3.

403: After receiving the first information, each UE of the multiples UEs stores the first information, so as to subsequently initiate a scheduling request according to the first information.

404: When satisfying a preset triggering condition, any UE of the multiple UEs sends an SR to the eNB on the first shared resource.

In this embodiment, further, the eNB may also allocate different timer values (SR-Prohibit Timer values) to the multiple UEs sharing the resource, and notifies the UEs through an RRC message, a MAC message or a physical layer message. The UEs may determine whether to continue the sending of the SR or cancel the SR according to the timer and the triggering condition of the SR, which specifically is the same as the description in Embodiment 3. By configuring different timers for the multiple UEs sharing the resource, another conflict may be avoided when the SR is sent again after a conflict, and thereby the possibility of successive conflicts is reduced.

405: The eNB receives the SR from the first shared resource. The resource is shared by multiple UEs, so the SR received by the eNB may be sent by one UE of the multiple UEs, and may also be an SR sent by at least two UEs at the same time.

406: The eNB does not allocate an identification index number to the UE, and therefore, after the eNB receives the SR, the eNB cannot judge which UE sends the SR, but may judge, according to the SR-RNTI, that the SR is a SR from the shared resource, so the eNB allocates a dedicated resource used for uplink data to at least one UE of the multiple UEs according to a C-RNTI, or allocates a second shared resource used for uplink data to the multiple UEs according to an SR-RNTI, where the command includes a specific time-frequency resource, an MCS (Modulation and Coding Scheme, modulation and coding scheme), a TB (Transport Block, transport block) size and so on, and may further include power information.

When allocating the dedicated resource used for uplink data, specifically, the eNB sends one PDCCH command to each UE, and scrambles the command by using a C-RNTI of each UE, so that each UE decodes the received PDCCH command by using its own C-RNTI, thereby obtaining information of the dedicated resource used for uplink data allocated by the eNB for the UE itself. When the eNB allocates the dedicated resource used for uplink data, an NDI may be set to be new data transmission, that is to say, set to be different from an NDI value that is set when the C-RNTI is used for scheduling last time.

When allocating the second shared resource used for uplink data, the eNB needs to send only one PDCCH command that is scrambled by the SR-RNTI, and after receiving the PDCCH command, each UE decodes the PDCCH command by using the SR-RNTI stored by the UE itself, so as to obtain information of the second shared resource that is used for uplink data and allocated by the eNB. When the eNB allocates the second shared resource, the NDI value may be set to a preset value indicating new data transmission, for example, set to 0 or 1 indicating new data transmission.

407: After sending the SR, any UE of the multiple UEs intercepts the PDCCH command from the eNB, and judges whether the intercepted PDCCH command is scrambled by using the C-RNTI allocated to the UE itself, and if yes, performs 408; otherwise, performs 410.

408: In this case, it is indicated that the eNB allocates a dedicated resource used for uplink data to a current UE, and therefore, the UE transmits the uplink data to the eNB on the dedicated resource. The current UE refers to any UE of the multiple UEs that currently has intercepted the PDCCH command, and specifically, the UE performs new data transmission according to the NDI in the PDCCH command, and in this TTI, the current UE no longer intercepts whether the PDCCH command that is from the eNB and scrambled by the SR-RNTI is received. If it is new data transmission, the SR is cancelled after a cancellation condition of the SR is satisfied.

409: The eNB receives uplink data from the dedicated resource; if the uplink data is decoded successfully, feeds back an ACK message to the UE corresponding to the dedicated resource; and if the uplink data is not decoded, feeds back an NACK message to the UE corresponding to the dedicated resource, and subsequently, may require the UE to retransmit or discard the uplink data according to requirements. The procedure ends.

410: The current UE judges whether the intercepted PDCCH command is scrambled by the SR-RNTI, and if yes, it is indicated that the eNB allocates the second shared resource used for uplink data to the current UE. Therefore, the UE sends uplink data to the eNB on the second shared resource, and carries its own C-RNTI in the uplink data. Specifically, the UE performs new data transmission according to the NDI in the PDCCH command that is scrambled by the SR-RNTI. The UE may record the value of the NDI, or may not record the value of the NDI. If it is new data transmission, the SR is cancelled after the cancellation condition of the SR is satisfied; or, if it is new data transmission, and the ACK returned by the eNB is received after the data is sent, the SR is cancelled after the cancellation condition of the SR is satisfied.

Further, this step may be replaced by the following step: The current UE judges whether the NACK message which is returned by the eNB for the uplink data that is sent by the current UE before a current TTI (Transmission Time Interval, transmission time interval) is received; and if yes, it is indicated that the uplink data sent by the current UE previously fails, and therefore, the PDCCH command that is scrambled by the SR-RNTI and is from the eNB is not intercepted in the current TTI. That is, new data transmission is not performed in the current TTI, but retransmission of the uplink data that fails to be sent previously is performed according to requirements, and it is started or continued to intercept, from a next TTI on, whether the PDCCH command that is scrambled by the SR-RNTI and is from the eNB is received; and if yes, the uplink data is sent to the eNB on the shared resource that is used for uplink data and allocated by the eNB, and new data transmission is performed.

411: The eNB receives the uplink data from the second shared resource; if the uplink data is decoded successfully, feeds back an ACK message through the PHICH; and if the uplink data is not decoded, feeds back an NACK message through the PHICH, and subsequently, may require the UE to retransmit or discard the uplink data according to requirements. The procedure ends.

Further, after 411, the following steps may be included:

When the eNB judges that multiple UEs send the uplink data on the second shared resource at the same time, or, when the eNB does not decoded the uplink data successfully on the second shared resource, it is considered that a conflict occurs, the eNB may reallocate a dedicated resource used for uplink data to the current UE, and the current UE retransmits the uplink data to the eNB on the dedicated resource used for uplink data. If the eNB does not allocate the uplink data sends the SR, the UE starts to intercept the PDCCH command that is scrambled by the SR-RNTI, and the specific value of the interval is not limited in the embodiment of the present invention. The UE may intercept, at any time, the PDCCH command that is scrambled by the C-RNTI, because the resource is dedicated and no conflict with another UE will occur.

In this embodiment, after any UE sends the SR, related operations of performing interception and sending in a certain TTI may be shown in Table 1.

TABLE 1

| Receiving Situation of UE on PHICH Channel | Receiving Situation of UE on PDCCH Channel | Behavior of UE |
| --- | --- | --- |
| ACK is received | the command that is scrambled by the C-RNTI has been intercepted | Perform uplink transmission according to the C-RNTI, no longer intercept, in this TTI, the PDCCH command that is scrambled by the SR-RNTI, and if it is new data transmission, cancel the SR after a cancellation condition of the SR is satisfied |
| ACK is received | the command that is scrambled by the SR-RNTI has been intercepted, and the command that is scrambled by the C-RNTI has not been intercepted | Perform uplink transmission according to the SR-RNTI |
| NACK is received | the command that is scrambled by the C-RNTI has been intercepted | Perform uplink transmission according to the C-RNTI, and no longer intercept, in this TTI, the PDCCH command that is scrambled by the SR-RNTI |
| NACK is received | the command that is scrambled by the C-RNTI has not been intercepted | Retransmit the uplink data that fails to be sent previously, no longer intercept in this TTI, and start or continue to intercept, from the next TTI on, the PDCCH command that is scrambled by the SR-RNTI Or, intercept, in this TTI, the PDCCH command that is scrambled by the SR-RNTI, and if it has been intercepted, perform uplink transmission according to the SR-RNTI, and discard the data that fails to be sent previously | dedicated resource to the current UE after conflict, after the current UE receives the NACK message of the eNB through the PHICH, the UE may withdraw for a random period of time, and resend the SR to request the uplink resource again, or after the configured timer SR-ProhibitTimer expires, the UE resends the SR to request the uplink resource again. The withdrawal time may be random, may be configured by the network side, may be configured by the UE itself, and may also be randomly selected by the UE between 0 and a configured value, which is not specifically limited in the embodiment of the present invention. Further, a threshold of times of the UE sending the SR may also be set, and after the times of the UE sending SR reaches the threshold, the SR is not sent any more, and a random access process may be triggered.

In this embodiment, for any UE, if the PDCCH command that is scrambled by the SR-RNTI and is from the eNB has been intercepted, the PDCCH command that is scrambled by the SR-RNTI and is from the eNB is not intercepted from the next TTI on, and interception starts after the SR is sent again.

In this embodiment, there is a minimum interval, which is generally 4 TTIs, between the time when the UE starts to intercept the PDCCH command that is scrambled by the SR-RNTI and is from the eNB and the time when the UE sends the SR, that is to say, after 4 TTIs from when the UE When the UE has intercepted the PDCCH command that is scrambled by the C-RNTI, if the UE has sent the data previously, no matter the eNB feeds back the ACK or the NACK, the UE performs new data transmission according to the C-RNTI, and no longer intercepts the PDCCH command that is scrambled by the SR-RNTI in this TTI. When the UE has not intercepted the PDCCH command that is scrambled by the C-RNTI, if the UE has sent the data previously, when the eNB feeds back the ACK indicating that the previous data is sent successfully, the UE intercepts, in this TTI, the PDCCH command that is scrambled by the SR-RNTI, and when the PDCCH command that is scrambled by the SR-RNTI has been intercepted, performs new data transmission according to the SR-RNTI. When the eNB feeds back the NACK indicating the previous data fails to be sent, either of the following two operations may be selected: (1) Retransmit the uplink data that fails to be sent previously, no longer perform interception in this TTI, and start or continue to intercept, from the next TTI on, the PDCCH command that is scrambled by the SR-RNTI; and (2) intercept, in this TTI, the PDCCH command that is scrambled by the SR-RNTI, and when the PDCCH command that is scrambled by the SR-RNTI has been intercepted, perform new data transmission according to the SR-RNTI, and discard the data that fails to be sent previously.

In this embodiment, the network side device allocates the resource of the uplink data when an SR exists, and after acquiring the resource, the terminal device uses the resource to send the uplink data, which, in comparison with the prior art, reduces the occupation on the PUSCH resource, greatly avoids the waste of the uplink data resource, improves a utilization rate of the uplink data resource and a transmission success rate of the uplink data.

When the dedicated resource used for uplink data is allocated, occurrence of the conflict may be avoided, and a delay brought by retransmission after the terminal device withdraws due to the conflict may also be avoided. By allocating the SR-RNTI, the shared resource of the uplink data may be allocated to the terminal device, and in comparison with a conventional SR procedure in which the delay is reduced by reducing a period of the SR, the occupation on the SR resource may be greatly reduced, and thereby the number of accepted users is increased. By adopting a manner of sharing the resource for the scheduling request, a code word interval may be increased, and interference between SR resources is reduced, which thereby improves decoding performance of the SR. By configuring different timers for the multiple terminal devices sharing the SR resource, another conflict may be avoided when the SR is sent after the conflict, and thereby the possibility of successive conflicts is reduced.

When the terminal device fails to send the uplink data previously, the PDCCH command that is scrambled by the SR-RNTI and is from the eNB is not intercepted in the current TTI, which may enable the terminal device to perform the retransmission of the previous data preferentially, and avoids loss of previous data due to directly performing new data transmission. Any terminal device, which has intercepted the PDCCH command that is scrambled by the SR-RNTI, no longer intercepts, from the next TTI on, the PDCCH command that is scrambled by the SR-RNTI and starts interception after sending the SR again, which avoids that because the eNB allocates the shared resource of uplink data after receiving the SR of another UE, the data is sent on the shared resource of the uplink data so that the conflict with another UE occurs.

Embodiment 5

Figure 5:
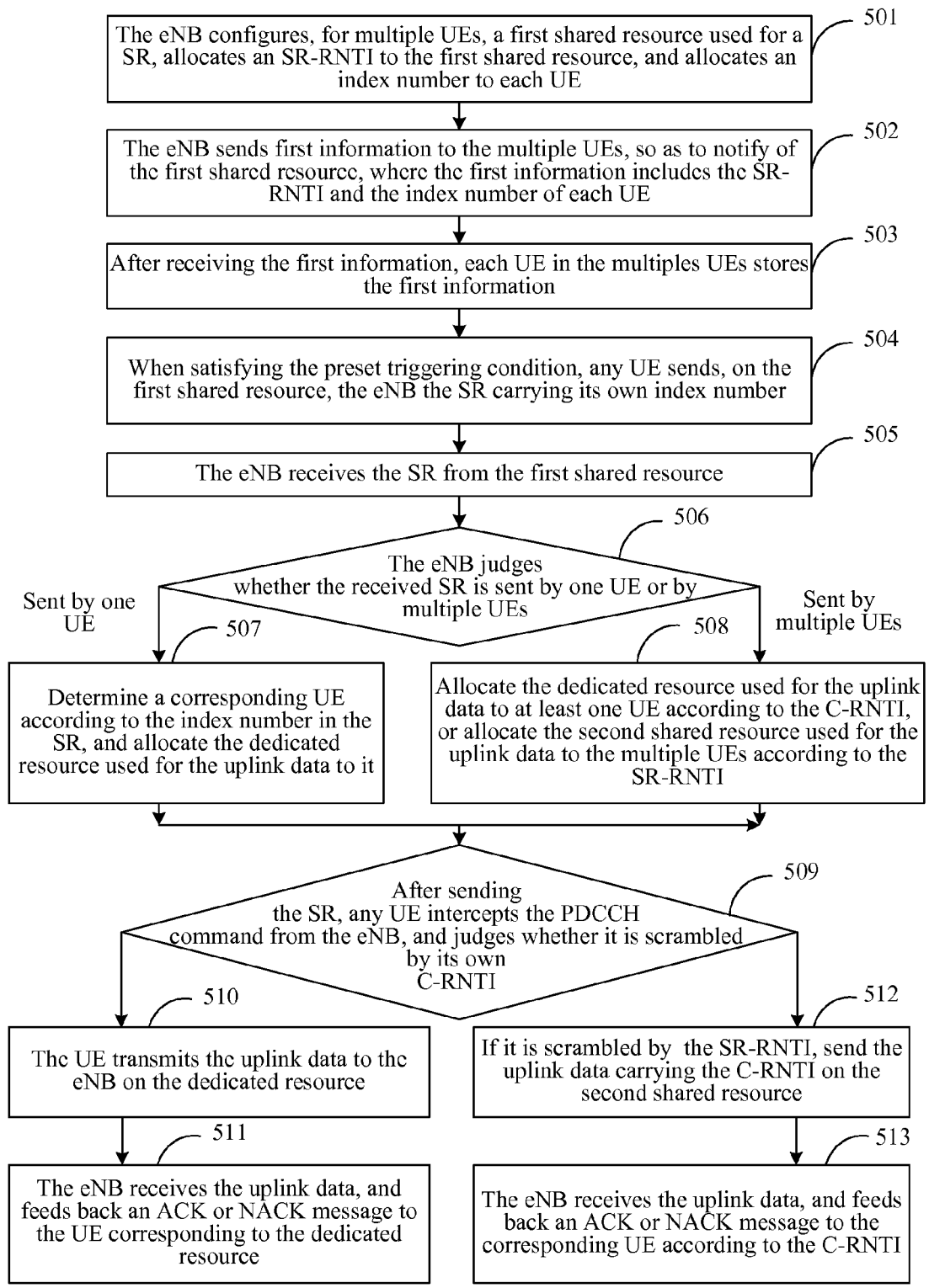
FIG. 5 is a flow chart of a scheduling request method according to Embodiment 5 of the present invention.

Referring to FIG. 5, this embodiment provides a scheduling request method, which is applicable to a scenario in which an eNB allocates an identifier to a shared resource used for a scheduling request, and allocates an index number to a UE, and specifically includes the following content.

501: The eNB configures a first shared resource for multiple UEs, where the first shared resource is used for a UE to send an SR, and allocates an index number to each UE of the multiple UEs, and optionally, may also allocate an SR-RNTI to the first shared resource.

How the eNB specifically determines which UEs share a SR resource is the same as the description in Embodiment 3.

The index number allocated by the eNB to the UE is used to identify a specific UE, and the index number of each UE is unique. For example, 2 UEs share a resource, so the index numbers may be 0 and 1, which is not specifically limited in the embodiment of the present invention.

502: The eNB sends first information to the multiple UEs, so as to notify the multiple UEs of the first shared resource, where the first information includes the index number of each UE, and also includes the allocated SR-RNTI if the SR-RNTI is allocated.

How the eNB specifically sends the first information to the multiple UEs, and the content in the first information except the SR-RNTI and the index number of each UE, are the same as the description in Embodiment 3.

Further, in this embodiment, when sending the first information to the UE, the eNB may also notify the UE of a format of the first shared resource, specifically, may notify the UE through a PUCCH Format parameter. For example, a PUCCH Format 1a is used to notify the UE that there are totally 2 UEs sharing the resource, 1a carries 1 bit of valid information, and is capable of identifying 2 UEs; or a PUCCH Format 1b is used to notify the UE that there are totally 4 UEs sharing the resource, 1b carries 2 bits of valid information, and is capable of identifying 4 UEs. In addition, a new PUCCH Format may also be expanded according to requirements to identify a greater number of UEs sharing the resource, which is not specifically limited in the embodiment of the present invention.

503: After receiving the first information, each UE of the multiples UEs stores the first information, so as to subsequently initiate a scheduling request according to the first information.

504: When satisfying the preset triggering condition, any UE of the multiple UEs sends the SR to the eNB on the first shared resource, and in the SR, carries the index number that is allocated by the eNB to the UE itself.

In this embodiment, further, the eNB may also allocate different timer values (SR-Prohibit Timer values) to the multiple UEs sharing the resource, and notifies the UEs through an RRC message, a MAC message or a physical layer message. The UE may decide, according to the timer and the triggering condition of the SR, whether to continue the sending of the SR or cancel the SR, which specifically is the same as the description in Embodiment 3. By configuring different timers for the multiple UEs sharing the resource, another conflict may be avoided when the SR is sent again after the conflict, and thereby, the possibility of successive conflicts is reduced.

505: The eNB receives the SR from the first shared resource. The resource is shared by multiple UEs, so the SR received by the eNB may be sent by one UE of the multiple UEs, and may also be the SR sent by at least two UEs at the same time.

506: The eNB judges whether the received SR is sent by one UE or sent by multiple UEs, and if it is sent by one UE, performs 507; otherwise, performs 508.

507: If the SR received by the eNB is the SR sent by one UE of the multiple UEs, that is, no conflict occurs, it may be determined, according to the index number carried in the SR, which specific UE sends the SR, and a dedicated resource used for uplink data is allocated to the UE, specifically, the UE is notified by a PDCCH command that is scrambled by the C-RNTI of the UE, and then 509 is performed.

508: If the SR received by the eNB is the SR sent by at least two UEs of the multiple UEs at the same time, that is, it is indicated a conflict occurs, the eNB cannot find, by decoding, which specific UE sends the SR, and therefore, according to the C-RNTI, the dedicated resource used for uplink data is allocated to at least one UE of the multiple UEs, or in a case that the SR-RNTI is allocated, a second shared resource used for uplink data is allocated to the multiple UEs according to the SR-RNTI, where the command includes a specific time-frequency resource, an MCS, a TB size, and may also include power information, and then 509 is performed.

When the eNB allocates the dedicated resource used for uplink data, specifically, may send one PDCCH command to each UE, and scrambles the command by a C-RNTI of each UE, so that each UE decodes the received PDCCH command by its own C-RNTI. The eNB may set an NDI in the PDCCH command to be new data transmission, that is to say, set to be different from an NDI value that is set when the C-RNTI is used for scheduling last time Moreover, based on requirements, the eNB may also schedule retransmission of data sent by a certain UE or some UEs previously, and in this case, the NDI value in the PDCCH command is the same as the NDI value when the UE is scheduled last time.

When allocating the second shared resource used for uplink data, the eNB needs to send only one PDCCH command that is scrambled by the SR-RNTI, and after receiving the PDCCH command, each UE decodes the PDCCH command by the SR-RNTI stored by the UE itself. The eNB may set the NDI value in the PDCCH command to be a preset value, indicating new data transmission, for example, set to be 0 or 1, indicating new data transmission.

509: After sending the SR, any UE of the multiple UEs intercepts the PDCCH command from the eNB, and judges whether the intercepted PDCCH command is scrambled by the C-RNTI allocated to the UE itself, and if yes, performs 510; otherwise, performs 512.

510: In this case, it is indicated that the eNB allocates a dedicated resource used for uplink data for a current UE, and therefore, the UE transmits the uplink data to the eNB on the dedicated resource. The current UE refers to any UE of the multiple UEs that currently has intercepted the PDCCH command, and specifically, the UE performs new data transmission according to the NDI in the PDCCH command, and in this TTI, the current UE no longer intercepts whether the PDCCH command that is from the eNB and scrambled by the SR-RNTI is received. If it is new data transmission, the SR is cancelled after a cancellation condition of the SR is satisfied.

511: The eNB receives uplink data from the dedicated resource; if the uplink data is decoded successfully, feeds back an ACK message to the UE corresponding to the dedicated resource; and if the uplink data is not decoded, feeds back an NACK message to the UE corresponding to the dedicated resource, and subsequently, may require the UE to retransmit or discard the uplink data according to requirements. The procedure ends.

512: The current UE judges whether the intercepted PDCCH command is scrambled by the SR-RNTI, and if yes, it is indicated that the eNB allocates the second shared resource used for uplink data to the current UE. Therefore, the UE sends the uplink data to the eNB on the second shared resource, and carries its own C-RNTI in the uplink data. Specifically, the UE performs new data transmission according to the NDI in the PDCCH command that is scrambled by the SR-RNTI. The UE may record the value of the NDI, and may not record the value of the NDI. If it is new data transmission, the SR is cancelled after the cancellation condition of the SR is satisfied; or, if it is new data transmission, and the ACK returned by the eNB is received after the data is sent, the SR is cancelled after the cancellation condition of the SR is satisfied.

Further, this step may be replaced by the following step:

The current UE judges whether the NACK message which is returned by the eNB for the uplink data that is sent by the current UE before a current TTI is received; and if yes, it is indicated the current UE fails to send the uplink data previously, and therefore, the PDCCH command that is scrambled by the SR-RNTI and is from the eNB is not intercepted in the current TTI. That is, new data transmission is not performed in the current TTI, but retransmission of the uplink data that fails to be sent previously is performed according to requirements, and it is started or continued to intercept, from a next TTI on, whether the PDCCH command that is scrambled by the SR-RNTI and is from the eNB is received; and if yes, the uplink data is sent to the eNB on the second shared resource allocated by the eNB, and new data transmission is performed.

513: The eNB receives the uplink data from the second shared resource; if the uplink data is decoded successfully, feeds back an ACK message through a PHICH; and if the uplink data is not decoded, feeds back an NACK message through the PHICH, and subsequently, may require the UE to retransmit or discard the uplink data according to requirements. The procedure ends.

Further, in this embodiment, after 513, the following steps may be included:

When the eNB judges that multiple UEs send the uplink data on the second shared resource at the same time, or, when the eNB fails to decode the uplink data on the second shared resource, it is considered that a conflict occurs, the eNB may reallocate a dedicated resource used for uplink data to the current UE, and the current UE retransmits the uplink data to the eNB on the dedicated resource used for uplink data. The eNB may set the NDI to be retransmission when reallocating the dedicated resource used for uplink data. If the eNB does not allocate the uplink data dedicated resource to the current UE after conflict, after receiving the NACK message of the eNB through the PHICH, the UE may withdraw for a random period of time, and resend the SR to request the uplink resource again, or after the configured timer SR-ProhibitTimer expires, the UE resends the SR to request the uplink resource again. The withdrawal time may be random, may be configured by the network side, may be configured by the UE itself, and may also be randomly selected by the UE between 0 and a configured value, which is not specifically limited in the embodiment of the present invention. Further, a threshold of times of the UE sending the SR may also be set, and after the times of the UE sending SR reaches the threshold, the SR is not sent any more, and a random access process may be triggered.

In this embodiment, for any UE, if the PDCCH command that is scrambled by the SR-RNTI and is from the eNB has been intercepted, the PDCCH command that is scrambled by the SR-RNTI and is from the eNB is no longer intercepted from the next TTI on, and interception starts after the SR is sent again.

In this embodiment, there is a minimum interval, which is generally 4 TTIs, between the time when the UE starts to intercept the PDCCH command that is scrambled by the SR-RNTI and is from the eNB and the time when the UE sends the SR, and the specific value of the interval is not limited in the embodiment of the present invention. The UE may intercept, at any time, the PDCCH command that is scrambled by the C-RNTI, because the resource is dedicated and no conflict with another UE will occur.

In this embodiment, after any UE sends the SR, related operations of performing interception and sending in a certain TTI may be as shown in Table 1, and the specific process is the same as the illustration in Embodiment 4, which is not repeated in detail herein.

In this embodiment, the network side device allocates the resource of the uplink data when an SR exists, and after acquiring the resource, the terminal device uses the resource to send the uplink data, which, in comparison with the prior art, reduces occupation on the PUSCH resource, greatly avoids the waste of the uplink data resource, and increases a utilization rate of the uplink data resource and a transmission success rate of the uplink data.

When the dedicated resource used for uplink data is allocated, occurrence of the conflict may be avoided, and a delay brought by retransmission after the terminal device withdraws due to the conflict may also be avoided. By allocating the SR-RNTI, the shared resource of the uplink data may be allocated to the terminal device, and in comparison with a conventional SR procedure in which the delay is reduced by reducing a period of the SR, the occupation on the SR resource may be greatly reduced, and thereby the number of accepted users is increased.

By allocating the index number to the terminal device, when the SR is received, it may be directly determined from which UE the SR comes, which improves the efficiency of the scheduling request. By adopting a manner of sharing the resource for scheduling request, a code word interval may be increased, and interference between SR resources is reduced, and thereby, decoding performance of the SR is improved. By configuring different timers for the multiple terminal devices sharing the SR resource, another conflict may be avoided when the SR is sent again after the conflict, and thereby the possibility of successive conflicts is reduced.

When the terminal device fails to send the uplink data previously, the PDCCH command that is scrambled by the SR-RNTI and is from the eNB is no longer intercepted in the current TTI, which may enable the terminal device to perform the retransmission of the previous data preferentially, and avoids the loss of previous data due to directly performing new data transmission. Any terminal device, which has intercepted the PDCCH command that is scrambled by the SR-RNTI, no longer intercepts, from the next TTI on, the PDCCH command that is scramble by the SR-RNTI and is, and starts interception after the SR is sent again, which avoids that because the eNB allocates the shared resource of uplink data after receiving the SR of another UE, the data is sent on the shared resource of the uplink data so that the conflict with another UE occurs.

In the method provided in the foregoing embodiment, the UE may send the SR and the uplink data in a same TTI, or in different TTIs, which is not specifically limited in the embodiment of the present invention. When the UE cannot send the SR and the uplink data in the same TTI, the eNB that receives the uplink data may judge that the UE does not send the SR in this TTI.

In the method provided in the foregoing embodiment, when the eNB allocates, after receiving the SR, the dedicated resource of uplink data to at least one of the multiple UEs sharing the SR resource, it may be determined, according to a preset rule, which UEs of the multiple UEs the dedicated resource of uplink data is allocated to. Specifically, it may be judged whether an UE that has not sent an SR exists, and if yes, the dedicated resource of uplink data may not be allocated, that is, not be scheduled, to the UE that has not sent an SR, or, the scheduling of new transmission or retransmission is performed according to requirements. For example, if the uplink data and the SR of a certain UE cannot be sent in a same TTI, when the eNB receives the uplink data of the UE in a certain TTI, and receives the SR on the SR shared resource, where the multiple UEs sharing the SR resource includes the UE sending the uplink data, the eNB may determine that the UE does not send the SR in this TTI, and therefore, may not allocate the dedicated resource of uplink data to the UE. Further, it may be further judged whether the received uplink data of the UE is decoded correctly. If yes, ACK is fed back, and in this case, the UE may be scheduled to perform new transmission; otherwise, NACK is fed back, and in this case, the UE may be scheduled to perform retransmission.

In the method provided in the foregoing embodiment, after the eNB allocates the second shared resource of uplink data to the UE through the PDCCH command that is scrambled by the SR-RNTI, and the UE uses the second shared resource to send the uplink data, if the eNB does not decoded the uplink data successfully, the eNB feeds back the NACK to the UE, and allocates the dedicated resource of uplink data to at least one UE of the multiple UEs sharing the SR resource. Specifically, the dedicated resource of uplink data and the second shared resource allocated previously have a same TB size, and another parameter such as the MCS may be different. If the eNB uses another dedicated resource of uplink data to perform scheduling on the current UE before allocating the second shared resource, and when the dedicated resource of uplink data this time is allocated, an NDI may be set by adopting any one of the following two manners:

In a first manner, when the dedicated resource of uplink data is allocated this time, the value of the NDI is set to be the same as a NDI value at the time of allocating the second shared resource previously, and indicates retransmission. In a second manner, when the dedicated resource of uplink data is allocated this time, the value of the NDI is set to be the same as a NDI value at the time of allocating the dedicated resource of uplink data last time. The moment of allocating the dedicated resource of uplink data previously is recorded as a first TTI, the moment of allocating the shared resource of uplink data after the first TTI is recorded as a second TTI, the moment of allocating the dedicated resource of uplink data after the second TTI is recorded as a third TTI, and the specific processes in which the eNB sets the NDI and the UE understands the NDI are shown in Table 2 and Table 3. The Table 2 is corresponding to the first manner, the Table 3 is corresponding to the second manner, a time interval may exist between the first TTI, the second TTI, and the third TTI, and the value of the interval is not specifically limited in the embodiment of the present invention. The third TTI is the moment when the dedicated resource of uplink data is allocated this time.

TABLE 2

| eNB allocates the dedicated resource in the first TTI | eNB allocates the shared resource in the second TTI | eNB allocates the dedicated resource in the third TTI |
| --- | --- | --- |
| NDI = 0, and the PDCCH command that is scrambled by the C-RNTI is used | NDI = 0(or 1), and the PDCCH command that is scrambled by the SR-RNTI is used, indicating new data transmission, and transmission of the UE on the resource fails | NDI = 0(or 1), and the PDCCH command that is scrambled by the C-RNTI is used, indicating retransmission |

TABLE 2-continued

| eNB allocates the dedicated resource in the first TTI | eNB allocates the shared resource in the second TTI | eNB allocates the dedicated resource in the third TTI |
|---|---|---|
| NDI = 1, and the PDCCH command that is scrambled by the C-RNTI is used | NDI = 0(or 1), and the PDCCH command that is scrambled by the SR-RNTI is used, indicating new data transmission, and transmission of the UE on the resource fails | NDI = 0(or 1), and the PDCCH command that is scrambled by C-RNTI is used, indicating retransmission, but understood by the UE as new data transmission |
| NDI = 0, and the PDCCH command that is scrambled by the C-RNTI is used | NDI = 0(or 1), and the PDCCH command that is scrambled by the SR-RNTI is used, indicating new data transmission, and the UE does not send the SR, and does not perform transmission on the resource | NDI = 0(or 1), and the PDCCH command that is scrambled by C-RNTI is used, indicating retransmission |
| NDI = 1, and the PDCCH command that is scrambled by the C-RNTI is used | NDI = 0(or 1), and the PDCCH command that is scrambled by the SR-RNTI is used, indicating new data transmission, and the UE does not send the SR, and does not perform transmission on the resource | NDI = 0(or 1), and the PDCCH command that is scrambled by C-RNTI is used, indicating retransmission, but understood by the UE as new data transmission |

The eNB allocates the second shared resource of uplink data at the second TTI moment, where the value of the NDI may be set to be 0 or 1 according to requirements, indicating new data transmission. After a UE sends the data on the second shared resource, the eNB allocates, due to failed data decoding, the dedicated resource of uplink data at the third TTI moment, and sets an NDI value to be the same as the NDI value at the time of allocating the shared resource of uplink data at the second TTI moment, indicating retransmission. For example, if at the second TTI moment, NDI=0, set NDI=0 at the third TTI moment; and if at the second TTI moment, NDI=1, set NDI=1 at the third TTI moment.

For the UE that sends the SR and fails to transmit the data by the second shared resource, when the dedicated resource allocated at the third TTI moment is received, the NDI value is compared with the NDI value of the dedicated resource allocated previously at the first TTI moment, so that it is decided whether to perform new data transmission or retransmission. If the comparison result is the same, retransmission is performed, and if the comparison result is different, new data transmission is performed.

For the UE that neither sends the SR nor transmits the data by using the second shared resource, when the dedicated resource allocated at the third TTI moment is received, the NDI value is compared with the NDI value of the dedicated resource allocated previously at the first TTI moment, so as to decide whether to perform new data transmission or retransmission. If the comparison result is the same, retransmission is performed, and if the comparison result is different, new data transmission is performed.

TABLE 3

| eNB allocates the dedicated resource in the first TTI | eNB allocates the shared resource in the second TTI | eNB allocates the dedicated resource in the third TTI |
|---|---|---|
| NDI = 0, and the PDCCH command that is scrambled by the C-RNTI is used | NDI = 0 (or 1), and the PDCCH command that is scrambled by the SR-RNTI is used, indicating new data transmission, and transmission of the UE on the resource fails | NDI = 0, and the PDCCH command that is scrambled by the C-RNTI is used, indicating retransmission |
| NDI = 1, and the PDCCH command that is scrambled by the C-RNTI is used | NDI = 0 (or 1), and the PDCCH command that is scrambled by the SR-RNTI is used, indicating new data transmission, and transmission of the UE on the resource fails | NDI = 1, and the PDCCH command that is scrambled by the C-RNTI is used, indicating retransmission |
| NDI = 0, and the PDCCH command that is scrambled by the C-RNTI is used | NDI = 0 (or 1), and the PDCCH command that is scrambled by the SR-RNTI is used, indicating new data transmission, the UE does not send the SR, and does not perform transmission on the resource | NDI = 0, and the PDCCH command that is scrambled by the C-RNTI is used, indicating retransmission |
| NDI = 1, and the PDCCH command that is scrambled by the C-RNTI is used | NDI = 0 (or 1), and the PDCCH command that is scrambled by the SR-RNTI is used, indicating new data transmission, and the UE does not send the SR, and does not perform transmission on the resource | NDI = 1, and the PDCCH command that is scrambled by the C-RNTI is used, indicating retransmission |

The eNB allocates the second shared resource at the second TTI moment, where the value of the NDI may be set to be 0 or 1 according to requirements, and indicates new data transmission. After a UE sends the data on the second shared resource, the eNB allocates, due to failed data decoding, the dedicated resource of uplink data at the third TTI moment, and sets the NDI value to be the same as the NDI value at the time of allocating the dedicated resource of uplink data at the first TTI moment, indicating retransmission. For example, if at the first TTI moment, NDI=0, set NDI=0 at the third TTI moment; and if at the first TTI moment, NDI=1, set NDI=1 at the third TTI moment.

For the UE that sends the SR and fails to transmit the data by the second shared resource, when the dedicated resource allocated at the third TTI moment is received, the NDI value is compared with the NDI value of the dedicated resource allocated previously at the first TTI moment, so that it is decided whether to perform new data transmission or retransmission. In the implementation manner shown in Table 3, the comparison result is the same, and retransmission is performed.

For the UE that neither sends the SR nor transmits the data by the second shared resource, when the dedicated resource allocated at the third TTI moment is received, the NDI value is compared with the NDI value of the dedicated resource allocated previously at the first TTI moment, so that it is decided whether to perform new data transmission or retransmission. In the implementation manner shown in Table 3, the comparison result is the same, and retransmission is performed.

If in a retransmission command received by the UE, a TB size is different from a size of the sent data, the UE may not perform retransmission, and in this case, if the eNB detects DTX, it may be considered that the UE does not retransmit the data, and thereby, the retransmission of the UE is not scheduled any more. Alternatively, after detecting the DTX, the eNB schedules one or more times of retransmission, until reaching preset maximum times or it is considered that the UE does not retransmit the data.

In the foregoing two implementation manners, when receiving the PDCCH command that is scrambled by the eNB by the SR-RNTI, the UE may store the NDI in the PDCCH command, or may not store the NDI in the PDCCH command. No matter the NDI is stored or not, a processing procedure of the UE performing the new data transmission or retransmission according to the NDI is the same.

An embodiment of the present invention further provides scheduling request method, and the method includes that: a current terminal device receives first information sent by a network side device, where the first information is used for notifying of a first shared resource, the first shared resource is used for the terminal device to send a scheduling request to the network side device and is configured by the network side device for multiple terminal devices, and the multiple terminal devices include the current terminal device; the scheduling request SR is sent to the network side device on the first shared resource; and after the network side device allocates a second shared resource of uplink data to the multiple terminal devices, or allocates a dedicated resource used for uplink data to the current terminal device, the uplink data is sent to the network side device on the second shared resource or the dedicated resource.

(1) A first improvement is made on the basis of the foregoing method, where after the scheduling request SR is sent to the network side device on the first shared resource, the method further includes: after preset time expires, if a current triggering condition of the scheduling request is still satisfied, sending the SR again; or, if the current terminal device satisfies another triggering condition of the scheduling request, sending the SR again.

(2) A second improvement is made on the basis of the foregoing method, where the sending the uplink data to the network side device on the second shared resource or the dedicated resource specifically includes: intercepting whether a physical downlink control channel PDCCH command that is scrambled by a cell radio network temporary identifier C-RNTI and is from the network side device is received; if yes, sending the uplink data to the network side device on the dedicated resource allocated by the network side device; otherwise, intercepting whether the PDCCH command that is scrambled by a scheduling request radio network temporary identifier SR-RNTI and is from the network side device is received, and if yes, sending the uplink data to the network side device on the second shared resource allocated by the network side device.

(3) A third improvement is made on the basis of the foregoing method, where the sending the uplink data to the network side device on the second shared resource or the dedicated resource specifically includes: intercepting whether the PDCCH command that is scrambled by the C-RNTI and is from the network side device is received; if yes, sending the uplink data to the network side device on the dedicated resource allocated by the network side device; otherwise, determine whether a negative acknowledge NACK message which is returned by the network side device for the uplink data that is sent by the current terminal device before the current transmission time interval TTI is received, if yes, not intercepting, in the current TTI, the PDCCH command that is scrambled by the SR-RNTI and is from the network side device, and starting or continuing to intercept, from a next TTI on, whether the PDCCH command that is scrambled by the SR-RNTI and is from the network side device is received, if yes, sending the uplink data to the network side device on the second shared resource allocated by the network side device.

(4) On the basis of the second improvement or the third improvement, further, the method also includes: if the PDCCH command that is scrambled by the SR-RNTI and is from the network side device has been intercepted, not intercepting, from the next TTI on, the PDCCH command that is scrambled by the SR-RNTI and is from the network side device, until the SR is sent again.

(5) A fourth improvement is made on the basis of the foregoing method, after the uplink data is sent to the network side device on the second shared resource, the method further includes: after the network side device judges that another terminal device sends the uplink data at the same time on the second shared resource, receiving the dedicated resource of uplink data allocated by the network side device for the current terminal device, and retransmitting the uplink data to the network side device on the dedicated resource.

(6) A fifth improvement is made on the basis of the foregoing method, after the network side device allocates the second shared resource of uplink data to the multiple terminal devices, or allocates the dedicated resource used for uplink data to the current terminal device, the method further includes: if the current terminal device is in a discontinuous reception DRX mode and receives the PDCCH command that is scrambled by the SR-RNTI and is from the network side device, prolonging an active state of the terminal device.

Embodiment 6

Figure 6:
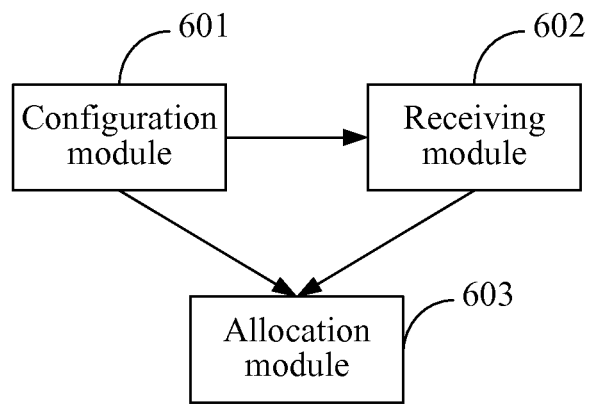
FIG. 6 is a structural diagram of a network side device according to Embodiment 6 of the present invention.

Referring to FIG. 6, this embodiment provides a network side device, which includes: a configuration module 601, a receiving module 602 and an allocation module 603.

The configuration module 601 configures a first shared resource for multiple terminal devices, where the first shared resource is used for a terminal device to send an SR, and sends first information to the multiple terminal devices, where the first information is used for notifying a terminal device of the first shared resource. The receiving module 602 receives the SR from the first shared resource. The allocation module 603, after the receiving module 602 receives the SR, allocates a second shared resource used for uplink data to the multiple terminal devices, or allocates a dedicated resource used for uplink data to at least one terminal device of the multiple terminal devices.

In this embodiment, as an optional implementation manner, the configuration module 601 may specifically include: a first configuration unit and a first sending unit, where, the first configuration unit configures the first shared resource for the multiple terminal devices, the first shared resource being used for a terminal device to send the SR, and allocates an SR-RNTI for the first shared resource; the first sending unit sends the first information to the multiple terminal devices, where the first information is used for notifying a terminal device of the first shared resource, and includes an SR-RNTI. Correspondingly, the allocation module 603 specifically includes: a first allocation unit, configured to allocate the dedicated resource used for uplink data to at least one terminal device of the multiple terminal devices according to a C-RNTI, or allocate the second shared resource used for uplink data to the multiple terminal devices according to the SR-RNTI.

As another optional implementation manner, the configuration module 601 may specifically include: a second configuration unit and a second sending unit, where, the second configuration unit configures the first shared resource for the multiple terminal devices, the first shared resource being used for a terminal device to send the SR, allocates an SR-RNTI to the first shared resource, and allocates an index number to each terminal device of the multiple terminal devices; the second sending unit sends the first information to the multiple terminal devices, where the first information is used for notifying a terminal device of the first shared resource, and includes the SR-RNTI and the index number of each terminal device. Correspondingly, the allocation module 603 specifically includes: a second allocation unit, configured to, if the SR received by the receiving module 602 is the SR sent by one terminal device of the multiple terminal devices, allocate the dedicated resource used for uplink data to the corresponding terminal device according to the index number carried in the SR, and if the SR received by the receiving module 602 is the SR sent by at least two terminal devices of the multiple terminal devices at the same time, allocate the dedicated resource used for uplink data to the at least one terminal device of the multiple terminal devices according to the C-RNTI, or allocate the second shared resource used for uplink data to the multiple terminal devices according to the SR-RNTI.

On the basis of the second implementation manner, further, the receiving module 602 is further configured to, after the second allocation unit allocates the second shared resource used for uplink data to the multiple terminal devices according to the SR-RNTI, receive the uplink data from the second shared resource; and correspondingly, the second allocation unit is further configured to, if the uplink data received by the receiving module 602 is not decoded successfully, allocate the dedicated resource used for uplink data to at least one terminal device of the multiple terminal devices.

In this embodiment, the allocation module 603 may specifically include: a third allocation unit, configured to, if the SR-RNTI is not allocated to the first shared resource, allocate the dedicated resource used for uplink data to at least one terminal device of the multiple terminal devices according to the C-RNTI.

In this embodiment, the first allocation unit is further configured to, when allocating the resource used for uplink data, set the NDI to be new data transmission. The third allocation unit is configured to, when allocating the resource used for uplink data, set the NDI to be new data transmission. The second allocation unit is further configured to, when the uplink data is not decoded successfully and the dedicated resource used for uplink data is allocated to at least one terminal device of the multiple terminal devices, set the NDI to be retransmission.

The network side device provided in this embodiment allocates the resource of the uplink data when an SR exists, so that after acquiring the resource, the terminal device uses the resource to send the uplink data, which, in comparison with the prior art, greatly avoids the waste of the uplink data resource, and increases a utilization rate of the uplink data resource and a transmission success rate of the uplink data.

When the dedicated resource used for uplink data is allocated, occurrence of the conflict may be avoided, occupation on the PUSCH resource is reduced, and a delay brought by retransmission after the terminal device withdraws due to the conflict may also be avoided. By allocating the SR-RNTI, the shared resource of the uplink data may be allocated to the terminal device, and in comparison with a conventional SR procedure in which the delay is reduced by reducing a period of the SR, the occupation on the SR resource may be greatly reduced, and thereby the number of accepted users is increased.

By allocating the index number to the terminal device, when the SR is received, it may be directly determined from which UE the SR comes, which improves the efficiency of the scheduling request. By adopting a manner of sharing the resource for scheduling request, a code word interval may be increased, and interference between SR resources is reduced, and thereby, decoding performance of the SR is improved. By configuring different timers for the multiple terminal devices sharing the SR resource, another conflict may be avoided when sending the SR after the conflict, and thereby, the possibility of successive conflicts is reduced.

Embodiment 7

Figure 7:
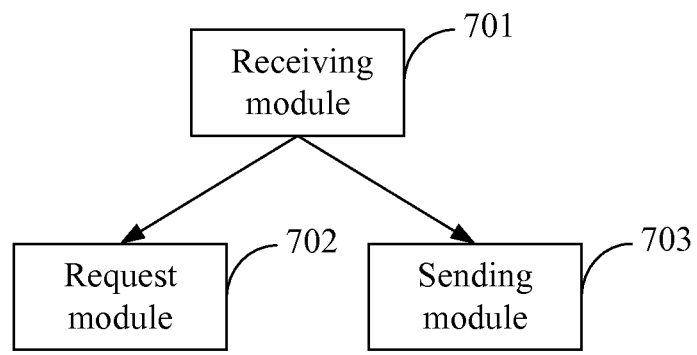
FIG. 7 is a structural diagram of a terminal device according to Embodiment 7 of the present invention.

Referring to FIG. 7, this embodiment provides a terminal device, which includes: a receiving module 701, a request module 702 and a sending module 703.

The receiving module 701 receives first information sent by a network side device, where the first information is used for notifying of a first shared resource, and the first shared resource is used for the terminal device to send an SR and is configured by the network side device for the terminal device and another terminal device together. The request module 702 sends an SR to the network side device on the first shared resource. The sending module 703, after the network side device allocates a second shared resource used for uplink data to the multiple terminal devices, or allocates a dedicated resource used for uplink data to the terminal device, sends the uplink data to the network side device on the second shared resource or the dedicated resource.

In this embodiment, the request module 702 is further configured to, after the SR is sent and preset time expires, and if the current triggering condition of the scheduling request is still satisfied, send the SR again; or, after the SR is sent, and if the terminal device satisfies another triggering condition of the scheduling request, send the SR again.

In this embodiment, as an optional implementation manner, the sending module 703 may specifically include: a first sending unit, configured to, after the network side device allocates the second shared resource or the dedicated resource, intercept whether a PDCCH command that is scrambled by a C-RNTI and is from the network side device is received; if yes, send the uplink data to the network side device on the dedicated resource; otherwise, intercept whether a PDCCH command that is scrambled by an SR-RNTI and is from the network side device is received, and if yes, send the uplink data to the network side device on the second shared resource. After the PDCCH command that is scrambled by the C-RNTI has been intercepted, if it is new data transmission, the SR is cancelled after a cancellation condition of the SR is satisfied.

As another optional implementation manner, the sending module 703 may specifically include: a second sending unit, configured to, after the network side device allocates the second shared resource or the dedicated resource, intercept whether the PDCCH command that is scrambled by the C-RNTI and is from the network side device is received; if yes, send the uplink data to the network side device on the dedicated resource; otherwise, judge whether an NACK message which is returned by the network side device for the uplink data sent by the terminal device before a current TTI is received; if yes, not intercept, in the current TTI, the PDCCH command that is scrambled by the SR-RNTI and is from the network side device, and start or continue to intercept, from the next TTI on, whether the PDCCH command that is scrambled by the SR-RNTI and is from the network side device is received; and if yes, send the uplink data to the network side device on the second shared resource. After the PDCCH command that is scrambled by the C-RNTI has been intercepted, if it is new data transmission, the SR is cancelled after a cancellation condition of the SR is satisfied.

On the basis of one of the foregoing two implementation manners, the sending module 703 is further configured to, if the PDCCH command that is scrambled by the SR-RNTI and is from the network side device has been intercepted, no longer intercept, from the next TTI on, the PDCCH command that is scrambled by the SR-RNTI and is from the network side device, until the request module 702 sends the SR again.

In this embodiment, further, the sending module 703 is further configured to, after the uplink data is sent to the network side device on the second shared resource and the network side device judges that another terminal device sends the uplink data on the second shared resource at the same time, receive the dedicated resource that is used for uplink data and allocated by the network side device to the terminal device, and retransmit the uplink data to the network side device on the dedicated resource.

In this embodiment, further, the terminal device may also include: a setting module, configured to, after the network side device allocates the second shared resource or the dedicated resource, and if the terminal device is in a DRX mode and receives the PDCCH command that is scrambled by the SR-RNTI and is from the network side device, prolong an active state of the terminal device.

In this embodiment, when the network side device allocates the shared resource of the uplink data to the terminal device, if the terminal device has intercepted the PDCCH command that is scrambled by the SR-RNTI and is new data transmission, the SR is canceled after the cancellation condition of the SR is satisfied; or, if it is new data transmission, and the ACK returned by the eNB is received after the data is sent, the SR is canceled after the cancellation condition of the SR is satisfied.

The terminal device provided in this embodiment, by sending the SR to the network side device, obtains the resource of the uplink data, so as to use the resource to send the uplink data, which, in comparison with the prior art, greatly avoids the waste of the uplink data resource, and increases a utilization rate of the uplink data resource and a transmission success rate of the uplink data.

When the terminal device uses the dedicated resource of uplink data, occurrence of the conflict may be avoided, occupation on the PUSCH resource is reduced, and a delay brought by retransmission after the terminal device withdraws due to the conflict is avoided. When the terminal device uses the shared resource that is used for the uplink data and allocated by the network side device according to the SR-RNTI, in comparison with a conventional SR procedure in which the delay is reduced by reducing the period of the SR, occupation on the SR resource may be greatly reduced, and thereby the number of accepted users is increased.

By allocating the index number to the terminal device, when the SR is received, it may be directly determined from which UE the SR comes, which improves the efficiency of the scheduling request. By adopting a manner of sharing the resource for the scheduling request, a code word interval may be increased, and interference between SR resources is reduced, and thereby decoding performance of the SR is improved. By configuring different timers for the multiple terminal devices sharing the SR resource, another conflict may be avoided when the SR is sent again after the conflict, and thereby the possibility of successive conflicts is reduced.

When the terminal device fails to send the uplink data previously, the PDCCH command that is scrambled by the SR-RNTI and is from the eNB is no longer intercepted in the current TTI, which may enable the terminal device to perform the retransmission of the previous data preferentially, and avoids the loss of previous data due to directly performing new data transmission. Any terminal device, which has intercepted the PDCCH command that is scrambled by the SR-RNTI, no longer intercepts, from the next TTI on, the PDCCH command that is scrambled by the SR-RNTI, and starts interception after sending the SR again, which avoids that because the eNB allocates the shared resource of uplink data after receiving the SR of another UE, the data is sent on the shared resource of the uplink data so that the conflict with another UE occurs.

Embodiment 8

Figure 8:
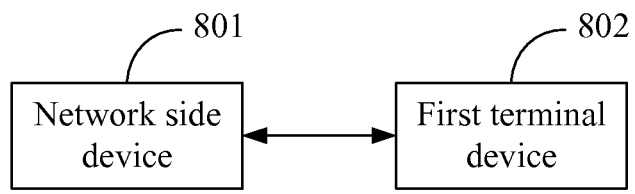
FIG. 8 is a structural diagram of a scheduling request system according to Embodiment 8 of the present invention.

Referring to FIG. 8, this embodiment provides a scheduling request system, which includes: a network side device 801 and a first terminal device 802.

The network side device 801 configures a first shared resource for multiple terminal devices, where the first shared resource is used for a terminal device to send an SR, and sends first information to the multiple terminal devices, where the first information is used for notifying of the first shared resource; receives the SR from the first shared resource; and allocates a second shared resource used for uplink data to the multiple terminal devices, or allocates a dedicated resource used for uplink data to at least one terminal device of the multiple terminal devices. The first terminal device 802 is one of the multiple terminal devices, and is configured to receive the first information sent by the network side device 801, send an SR to the network side device 801 on the first shared resource, and after the network side device 801 allocates the second shared resource or the dedicated resource, send the uplink data to the network side device 801 on the second shared resource or the dedicated resource.

In this embodiment, as an optional implementation manner, the network side device 801 may specifically include: a configuration module, configured to configure the first shared resource for multiple terminal devices, where the first shared resource is used for a terminal device to send an SR, allocate an SR-RNTI to the first shared resource, and send the first information to the multiple terminal devices, where the first information is used for notifying of the first shared resource and includes the SR-RNTI; a receiving module, configured to receive an SR from the first shared resource; and an allocation module, configured to allocate the second shared resource used for uplink data to the multiple terminal devices through a PDCCH command that is scrambled by the SR-RNTI, or allocate, through a PDCCH command that is scrambled by a C-RNTI, the dedicated resource used for uplink data to at least one terminal device that includes the first terminal device 802 and is of the multiple terminal devices. Correspondingly, the first terminal device 802 may specifically include: a receiving module, configured to receive the first information sent by the network side device 801; a request module, configured to send the SR to the network side device 801 on the first shared resource; and a sending module, configured to, after the network side device 801 allocates the second shared resource or the dedicated resource, intercept whether the PDCCH command that is scrambled by the C-RNTI and is from the network side device 801 is received, and if yes, send the uplink data to the network side device 801 on the dedicated resource; otherwise, intercept whether the PDCCH command that is scrambled by the SR-RNTI and is from the network side device 801 is received, and if yes, send the uplink data to the network side device 801 on the second shared resource.

As another optional implementation manner, the network side device 801 may specifically include: a configuration module, configured to configure the first shared resource for the multiple terminal devices, where the first shared resource is used for a terminal device to send an SR, allocate the SR-RNTI to the first shared resource, and send the first information to the multiple terminal devices, where the first information is used for notifying of the first shared resource and includes the SR-RNTI; a receiving module, configured to receive the SR from the first shared resource; and an allocation module, configured to allocate the second shared resource used for uplink data to the multiple terminal devices through a PDCCH command that is scrambled by the SR-RNTI, or allocate the dedicated resource used for uplink data to at least one terminal device that includes the first terminal device 802 and is of the multiple terminal devices through a PDCCH command that is scrambled by the C-RNTI. Correspondingly, the first terminal device 802 specifically includes: a receiving module, configured to receive the first information sent by the network side device 801; a request module, configured to send the SR to the network side device 801 on the first shared resource; and a sending module, configured to, after the network side device 801 allocates the second shared resource or the dedicated resource, intercept whether the PDCCH command that is scrambled by the C-RNTI and is from the network side device 801 is received; if yes, send the uplink data to the network side device 801 on the dedicated resource; otherwise, judge whether an NACK message which is returned by the network side device 801 for the uplink data that is sent by the first terminal device 802 before a current TTI is received, and if yes, no longer intercept, in the current TTI, the PDCCH command that is scrambled by the SR-RNTI and is from the network side device 801, and start or continue to intercept, from the next TTI on, whether the PDCCH command that is scrambled by the SR-RNTI and is from the network side device 801 is received, and if yes, send the uplink data to the network side device 801 on the second shared resource.

In this embodiment, further, the network side device 801 is further configured to, after receiving the uplink data sent by at least two terminal devices of the multiple terminal devices at the same time on the second shared resource, allocate a dedicated resource used for uplink data to at least one terminal device that includes the first terminal device 802 and is of the multiple terminal devices. Correspondingly, the first terminal device 802 is further configured to, after sending the uplink data on the second shared resource, receive the dedicated resource that is used for uplink data and allocated by the network side device 801 to the first terminal device 802, and retransmit the uplink data to the network side device 801 on the dedicated resource.

In this embodiment, the network side device 801 further has various functions of the network side device provided in Embodiment 6, and the terminal device 802 further has various functions of the terminal device provided in Embodiment 7, which are not repeated in detail herein.

In the system provided in this embodiment, the network side device allocates the resource of the uplink data when an SR exists, and after acquiring the resource, the terminal device uses the resource to send the uplink data, which, in comparison with the prior art, greatly avoids the waste of the uplink data resource, and increases a utilization rate of the uplink data resource and a transmission success rate of the uplink data.

When the network side device allocates the dedicated resource used for uplink data, occurrence of the conflict may be avoided, occupation on the PUSCH resource is reduced, and a delay brought by retransmission after the terminal device withdraws due to the conflict is avoided. The network side device, by allocating the SR-RNTI, may allocate the shared resource of uplink data to the terminal device, and in comparison with a conventional SR procedure in which the delay is reduced by reducing the period of the SR, the occupation on the SR resource may be greatly reduced, and thereby the number of accepted users is increased.

When receiving the SR, by allocating the index number to the terminal device, the network side device may directly determine from which UE an SR comes, which improves the efficiency of the scheduling request. By adopting a manner of sharing the resource for the scheduling request, a code word interval may be increased, and interference between SR resources is reduced, and thereby decoding performance of the SR is improved. By configuring different timers for the multiple terminal devices sharing the SR resource, another conflict may be avoided when the SR is sent again after the conflict, and thereby the possibility of successive conflicts is reduced.

When the terminal device fails to send the uplink data previously, the PDCCH command that is scrambled by the SR-RNTI and is from the eNB is no longer intercepted in the current TTI, which may enable the terminal device to perform the retransmission of the previous data preferentially, and avoids the loss of previous data due to directly performing new data transmission. Any terminal device, which has intercepted the PDCCH command that is scrambled by the SR-RNTI, no longer intercepts, from the next TTI, the PDCCH command that is scrambled by the SR-RNTI, and starts interception after sending the SR again, which avoids that because the eNB allocates the shared resource of uplink data after receiving the SR of another UE, the data is sent on the shared resource of the uplink data so that the conflict with another UE occurs.

The shared resource that is used for the scheduling request and described in any embodiment of the present invention may be a resource corresponding to a sub-frame, or a resource corresponding to different slots in the sub-frame. Specifically, two slots (Slot) in one sub-frame are allocated to different UEs. For example, the eNB allocates a first slot to UE1, allocates a second slot to UE2, and the eNB, according to SRs received at different slots, may judge which UE sends the SR, so as to allocate the resource of the uplink data for the corresponding UE.

The technical solution in any embodiment is directed to one member carrier, and when multiple member carriers exist, a processing procedure in every carrier is the same, and the carriers are not influenced by each other.

Further, in any embodiment, after the current terminal device sends the SR, if the current terminal device has intercepted the PDCCH command that is scrambled by the SR-RNTI and is from the network side device, and is in a DRX (Discontinuous Reception, discontinuous reception) mode, an active state of the current terminal device is prolonged. For example, an inactive timer (Inactive Timer) may be started or restarted, and the terminal device is in the active state before the timer expires, and is turned to the inactive state after the timer expires. Or, after the UE sends the data successfully on the resource corresponding to the command, that is, receives ACK of the eNB, the timer is started. By prolonging the active state of the terminal device, it may be ensured that the terminal device keep working all the time, which avoids packet loss and waste of signaling which are caused by missing the command of the dedicated resource scheduled by the eNB to the terminal device itself due to not being in the active state.

Finally it should be noted that, those of ordinary skill in the art can understand that all or a part of the flow of the method according to the foregoing embodiments may be completed by a computer program instructing relevant hardware. The program may be stored in a computer readable storage medium. When the program is run, the procedures of the foregoing methods according to the embodiments are performed. The storage medium may be a magnetic disk, an optical disk, a Read-Only Memory (ROM), or a Random Access Memory (RAM).

Various functional units in the embodiments of the present invention may be integrated in one processing module, and may also exist as physically separate units, and two or more of the units may also be integrated in one module. The integrated module may be implemented in a form of hardware, and may also be implemented in a form of a software functional module. If the integrated module is implemented in the form of the software functional module and is sold or used as an independent product, the integrated module may also be stored in a computer readable storage medium. The storage medium may be a read only storage, a magnetic disk, or an optical disk. The foregoing apparatus or system may perform the method in the corresponding method embodiment.

The above descriptions are merely exemplary embodiments of the present invention, but not intended to limit the present invention. Any modification, equivalent replacement, or improvement made without departing from the spirit and principle of the present invention shall fall within the protection scope of the present invention.

What is claimed is:

1. A system, comprising:
a base station, and
at least one terminal device among terminal devices, wherein
the base station is configured to
determine the at least one terminal device to share a scheduling request (SR) resource to send SRs to the base station, according to at least one communication factor of the at least one terminal device,
configure the shared SR resource for the at least one determined terminal device,
send information of the shared SR resource to the at least one determined terminal device,
receive an SR of the at least one terminal device from the shared SR resource, and
send information of a dedicated resource for uplink data to the at least one terminal device according to a cell radio network temporary identifier (C-RNTI) of the at least one terminal device in response to the SR; and
the at least one terminal device is configured to
receive the information of the shared SR resource from the base station,
send the SR to the base station on the shared SR resource,
receive the information of the dedicated resource for the uplink data from the base station;
send the uplink data on the dedicated resource to the base station.

2. The system according to claim 1, wherein the base station is configured to send the information of the shared SR resource to the at least one terminal device through a radio resource control protocol (RRC) message, or a media access control (MAC) message, or a physical layer message.

3. The system according to claim 1, wherein the at least one terminal device is configured to send the SR to the base station on the shared SR resource when the at least one terminal device satisfies a triggering condition.

4. The system according to claim 1, wherein the at least one terminal device is a plurality of determined terminal devices among the terminal devices, and the base station is further configured to allocate different timer values to the determined terminal devices respectively to avoid a conflict caused by sending an SR again.

5. The system according to claim 1, wherein the base station is configured to send a physical downlink control channel (PDCCH) command scrambled by the C-RNTI of the at least one terminal device, and wherein the PDCCH command comprises the information of the dedicated resource.

6. The system according to claim 5, wherein the at least one terminal device is configured to receive the PDCCH command by using the C-RNTI of the at least one terminal device and obtain the information of the dedicated resource for the uplink data.

7. The system according to claim 5, wherein the PDCCH command comprises a new data indicator (NDI) according to which the at least one terminal device decides whether to transmit new uplink data or perform a retransmission.

8. The system according to claim 1, wherein the base station is further configured to send an ACK message or an NACK message when the base station receives the uplink data on the dedicated resource.

9. The system according to claim 1, wherein the base station is further configured to allocate a scheduling request radio network temporary identifier (SR-RNTI) for the shared SR resource, and wherein the information of the shared SR resource includes the SR-RNTI.

10. A terminal device, comprising:
a receiver, and
a transmitter,
wherein
the receiver is configured to receive information of a shared scheduling request (SR) resource for sending an SR, the terminal device is selected to use the shared SR resource according to at least one communication factors of the terminal device;
the transmitter is configured to send the SR on the shared SR resource;
the receiver is further configured to receive information of a dedicated resource for uplink data;
the transmitter is further configured to send the uplink data on the dedicated resource.

11. The terminal device according to claim 10, wherein the receiver is configured to receive the information of the shared SR resource through a radio resource control protocol (RRC) message, or a media access control (MAC) message, or a physical layer message.

12. The terminal device according to claim 10, wherein the transmitter is configured to send the SR on the shared SR resource when the terminal device satisfies a triggering condition.

13. The terminal device according to claim 10, wherein the receiver is further configured to receive a timer value to use to avoid a conflict caused by sending another SR.

14. The terminal device according to claim 10, wherein the receiver is configured to receive a physical downlink control channel (PDCCH) command scrambled by a cell radio network temporary identifier (C-RNTI) of the first terminal device and wherein the PDCCH command comprises the information of the dedicated resource.

15. The terminal device according to claim 14, wherein the PDCCH command comprises a new data indicator (NDI) according to which the terminal device decides whether to transmit new uplink data or perform a retransmission.

16. The terminal device according to claim 10, wherein the receiver is further configured to receive an ACK message or an NACK message after the uplink data is sent on the dedicated resource.

17. The terminal device according to claim 10, wherein the information of the shared SR resource includes a scheduling request radio network temporary identifier (SR-RNTI) for the shared SR resource.

18. An apparatus, comprising:
at least one memory that stores software instructions, and
at least one hardware processor that causes, including by executing the software instructions, the apparatus to implement a base station, which is capable to communicationally couple to terminal devices, to:
determine at least one terminal device among the terminal devices to share a scheduling request (SR) resource to send SRs to the base station, according to at least one communication factor of the at least one terminal device,
configure the shared SR resource for the at least one determined terminal device,
send information of the shared SR resource to the at least one determined terminal device,
receive an SR of the at least one terminal device from the shared SR resource, and
send information of a dedicated resource for uplink data to the at least one terminal device according to a cell radio network temporary identifier (C-RNTI) of the at least one terminal device in response to the SR,
thereby causing the at least one terminal device to:
receive the information of the shared SR resource from the base station,
send the SR to the base station on the shared SR resource,
receive the information of the dedicated resource for the uplink data from the base station;
send the uplink data on the dedicated resource to the base station.

* * * * *